(12) United States Patent
Horng et al.

(10) Patent No.: US 7,342,336 B1
(45) Date of Patent: Mar. 11, 2008

(54) MOTOR STRUCTURE

(75) Inventors: Alex Horng, Kaohsiung (TW); To-Nien San, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/652,117

(22) Filed: Jan. 11, 2007

(30) Foreign Application Priority Data

Dec. 13, 2006 (TW) .............................. 95146592 A

(51) Int. Cl.
*H02K 15/00* (2006.01)
(52) U.S. Cl. ........................................ 310/90; 384/903
(58) Field of Classification Search ................. 310/90, 310/67 R; 384/903, 244, 246, 420
See application file for complete search history.

(56) References Cited

U.S. PATENT DOCUMENTS 4,968,910 A * 11/1990 Meier et al. ................... 310/42

6,498,412 B2 * 12/2002 Horng .......................... 310/91
6,720,694 B2 * 4/2004 Horng et al. .................. 310/90

* cited by examiner

*Primary Examiner*—Dang Le
(74) *Attorney, Agent, or Firm*—Bacon & Thomas, PLLC

(57) ABSTRACT

The present invention relates to a motor structure, which has a shaft tube and a stator set disposed on a base. The shaft tube is in form of a circular tube, the bottom side thereof is in an integrally-formed and closed pattern, and an abrasive gasket, a limit member and a bearing are disposed in the shaft tube, such that a spindle of a rotor can be inserted in the bearing and rotate therein. As the limit member has an annular wall with a specific height, a plurality of limit protrusions extended inward from the inner wall of the through hole can snap a reduced neck of the spindle to limit its axial displacement, thereby attaining the design object of reserving enough space for accommodating an end section of the spindle, reducing necessary parts, assembling process, and saving production cost.

3 Claims, 5 Drawing Sheets

MOTOR STRUCTURE

FIELD OF THE INVENTION

The present invention relates to a motor structure, and more particularly to a practical structure that can save cost, labor hour and production process and secure fast and convenient assembly.

BACKGROUND OF THE INVENTION

As shown in FIG. 1, a conventional motor structure includes a rotor 10 centrally bundled and fixed with one end of a spindle, in which a end section 12 is formed on the other end of the spindle 11, and a reduced neck 13 with a smaller outer diameter is formed over the end section 12; a base 20 having a shaft tube 21 and a stator set 22 disposed thereon, in which the shaft tube 21 can be assembled or integrally formed on the base, the bottom end of the shaft tube 21 is sealed, an abrasive gasket 23, a washer 24, a retainer ring 25 and a bearing 25 are sequentially placed in the shaft tube 21, a positioning ring 27 is tightly fixed inside the shaft tube 21 near an opening at one end thereof so as to steadily position the bearing 26, the retainer ring 25 and so forth inside the shaft tube 21, and the stator set 22 is located on the periphery of the shaft tube 21 and is optionally in a radial winding or axial winding structure.

While the rotor 10 is assembled with the base 20, the spindle 11 of the rotor 10 penetrates through the center bore of the positioning ring 27, the bearing 26 and the retainer ring 25, and while the end section 12 of the spindle 11 urges against the retainer ring 25, an larger external force shall be applied to force the end section 12 to penetrate through the retainer ring 25 so that the retainer ring 25 snaps on the reduced neck 13 of the spindle 11 to limit an axial displacement of the spindle 11 with respect to the shaft tube 21 and to prevent the rotor 10 from dropping off.

Whereas, due to a multitude of composing members involved, the conventional motor structure has the following resulting disadvantages:

high production cost and complex assembling processes: In addition to the bearing and the positioning ring, the abrasive gasket, the washer and the retainer ring that are disposed inside the shaft tube of the conventional motor structure result in the production cost hike and complexity of the assembling process, thus coercing assembler to place the above-mentioned parts inside the shaft tube in a correct sequence within a short period of time. However, the abrasive gasket and the retainer ring all pertain to sheet-like parts and thus are easily mixed up to lead to a higher defective rate during assembling.

assembling difficulty: After the abrasive gasket and the washer is placed in the shaft tube, the retainer ring is the first in line to be assembled. However, assembling the retainer ring shall take tremendous care and the placement of the retainer ring shall be level and firm. Otherwise, the retainer ring is prone to an oblique placement inside the shaft tube as shown in FIG. 2, which makes the motor structure fail to be normally assembled.

As a consequence, to completely tackle the issue intrinsic to the above-mentioned conventional motor structure, a motor structure with a brand new idea must be aggressively conceived and developed to take both the product cost ad quality into account.

SUMMARY OF THE INVENTION

In view of the foregoing concern, the present invention thus provides a motor structure including a rotor centrally fixed with one end of a spindle, in which the end has a reduced neck with a smaller outer diameter; a base having a shaft tube and a stator set, in which the shaft tube exhibits a form of circular tube, a bottom end section thereof shall be in an integrally-formed and closed pattern so that its cross section exhibits a ⌑-like form, and an abrasive gasket, a limit member and a bearing are sequentially placed in the shaft tube and a positioning ring is tightly fixed inside the shaft tube near a top end opening thereof so that the aforementioned parts are steadily positioned inside the shaft tube and the spindle is rotationally and centrally inserted in the bearing.

As the limit member of the present invention has an annular wall having a certain height and a center through hole, a plurality of limit protrusions on the inner wall of the through hole are extended toward a center of the through hole for snapping the reduced neck of the spindle to limit an axial displacement of the spindle. Therefore, after the end section of the spindle passes through a central snap hole of every limit protrusion, enough accommodation space for the end section can be reserved so as to reduce parts and assembling processes and save production cost.

DETAILED DESCRIPTION OF THE PREFERRED EMBODIMENT

Figure 1:
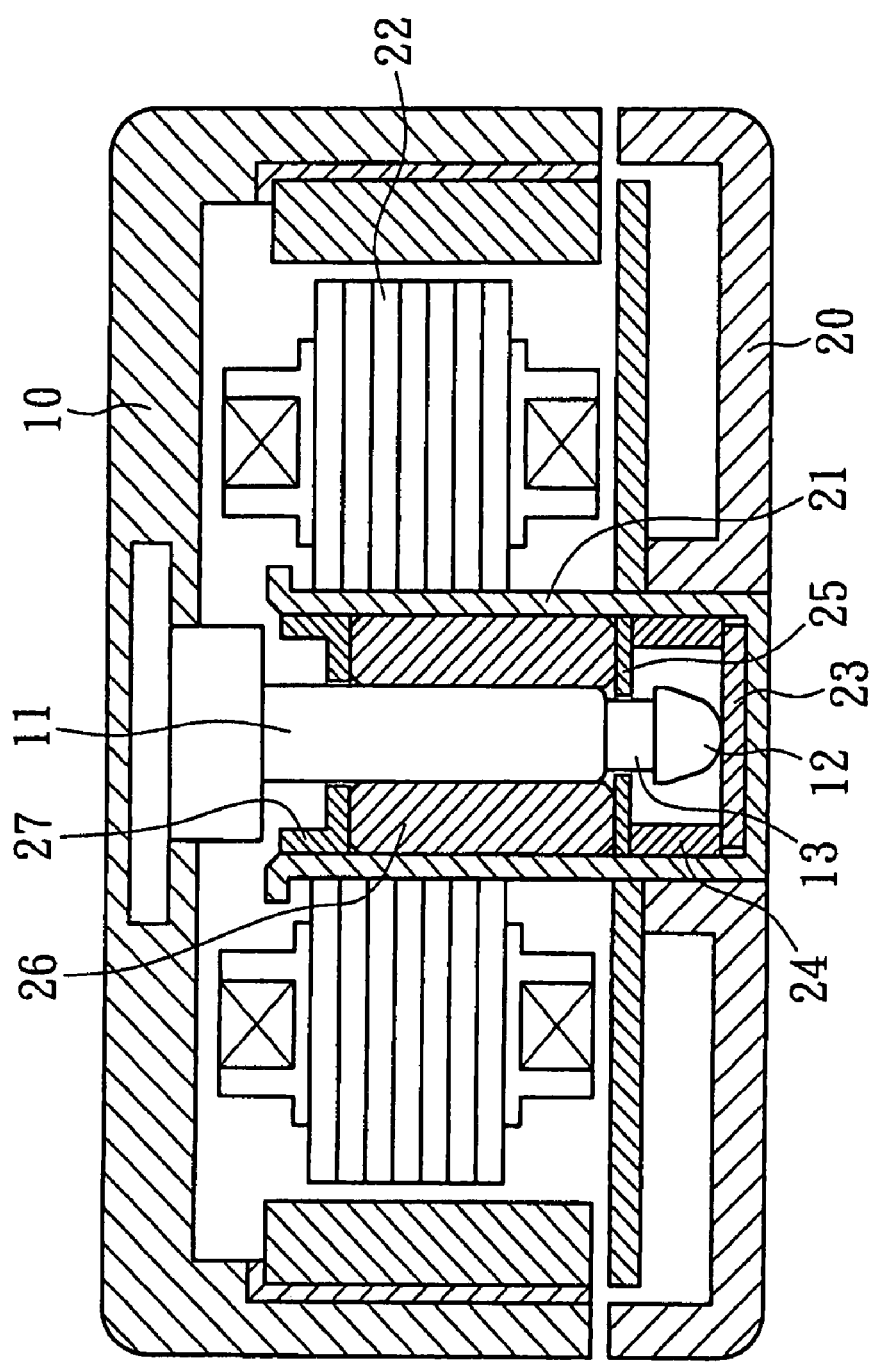
FIG. 1 is a cross-sectional view of a conventional motor structure.
Figure 2:
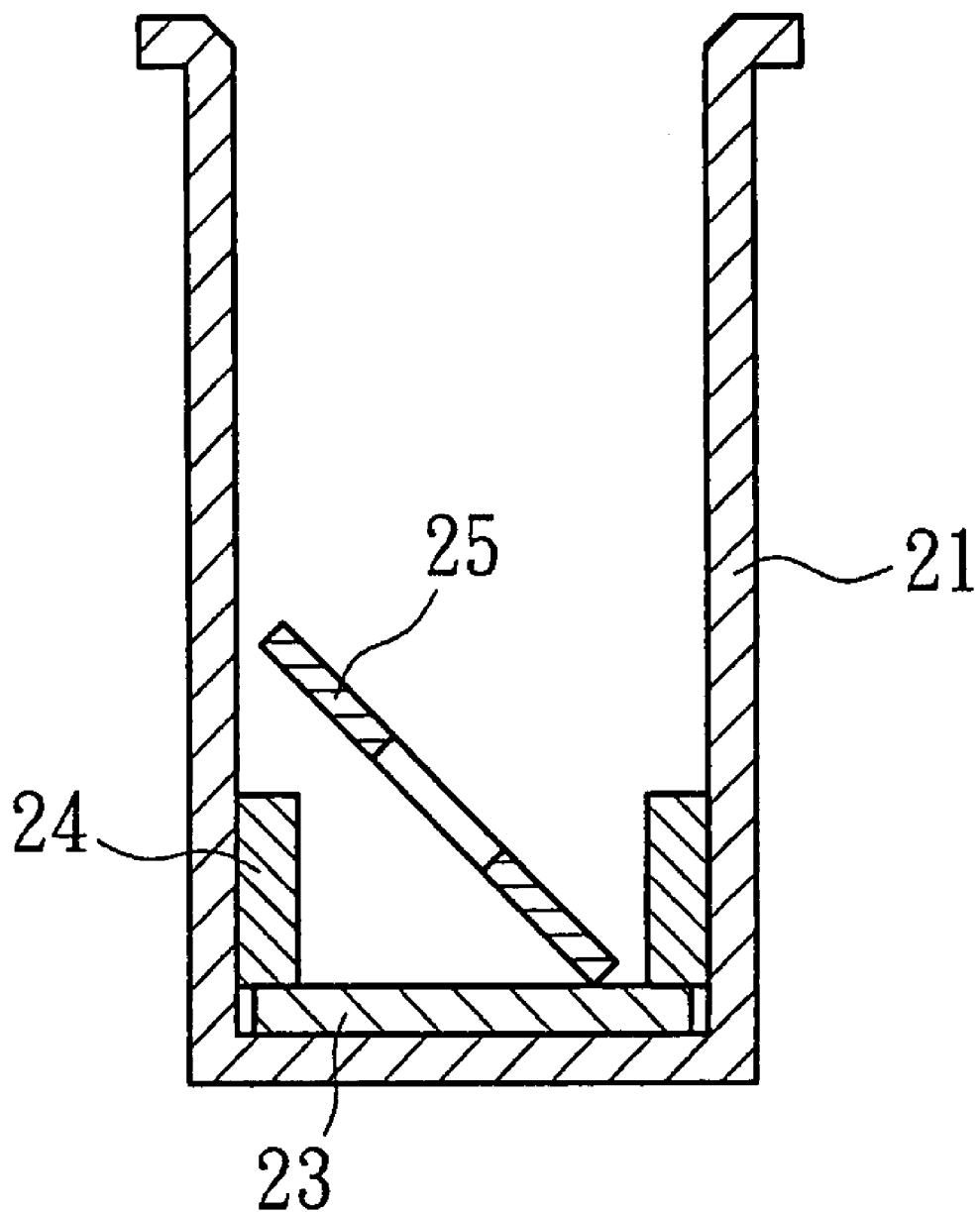
FIG. 2 is an assembling status view of the conventional structure.
Figure 3:
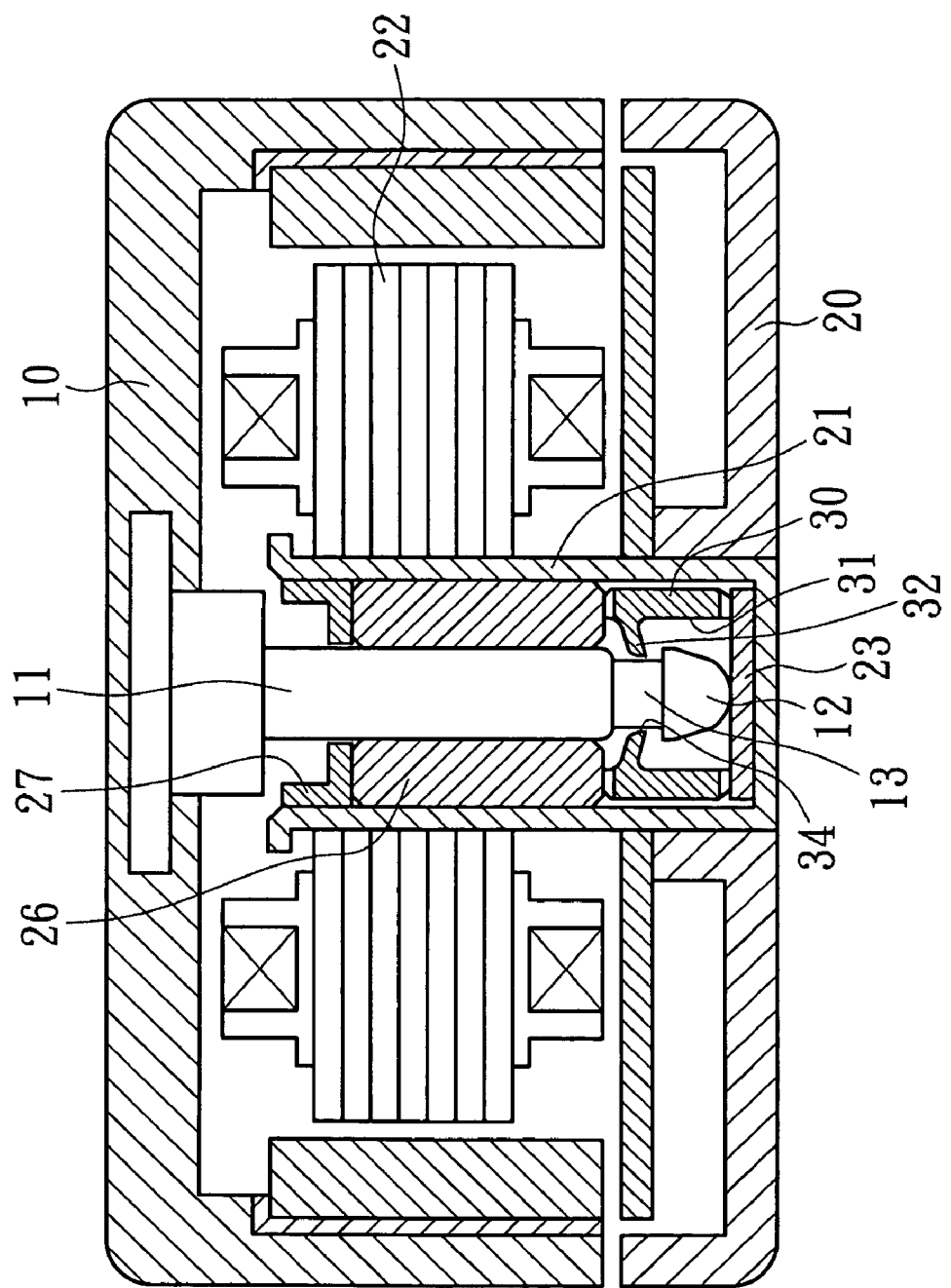
FIG. 3 is a cross-sectional view of an assembly of the present invention.

The present invention relates to a motor structure as shown in FIG. 3, which includes a rotor 10 centrally fixed with one end of a spindle 11, in which an end section 12 is formed on the other end of the spindle 11, and the end section 12 has a reduced neck 13 with a smaller outer diameter; a base having a shaft tube 21 and a stator set 22 disposed thereon, in which the shaft tube 21 is in form of a circular tube, the bottom side thereof shall be in an integrally-formed and closed pattern so as to have a ⌑-like cross section, the shaft tube 21 can be assembled or integrally formed on the base 20, an abrasive gasket 23, a limit member 30 and a bearing 26 are sequentially placed in the shaft tube 21, a positioning ring 27 is tightly fitted in the top end opening inside the shaft tube 21 so that the bearing 26, the limit member 30 and so forth are steadily positioned inside the shaft tube 21, the bearing 26 can be any type of a sleeve bearing, a roller bearing, a hydrodynamic bearing, etc. for the spindle 11 to be rotationally and centrally inserted therein, and the stator set 22 is located on the periphery of the shaft tube 21 and is optionally a radial winding or an axial winding structure.

Figure 4:
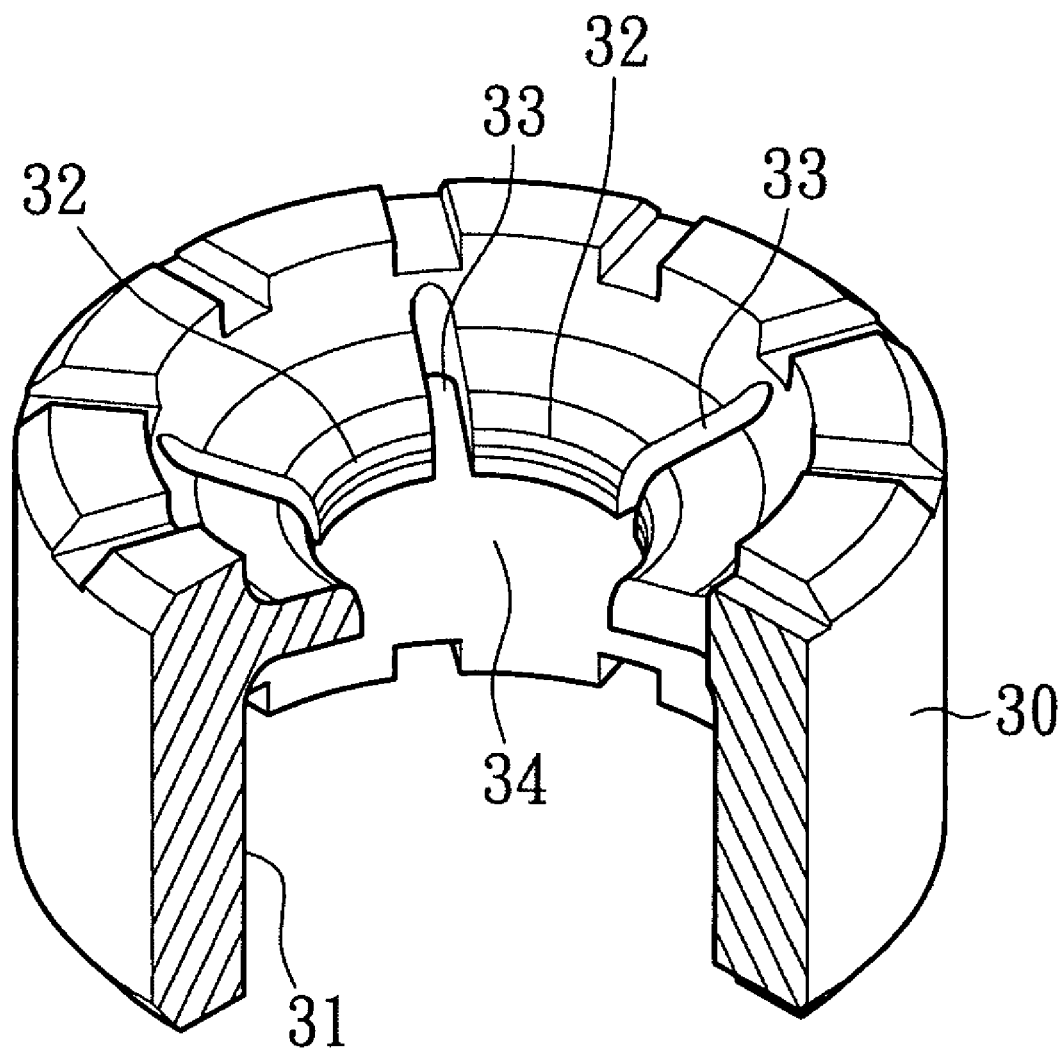
FIG. 4 is an external view of a limit member of the present invention.

Together with the illustration of FIG. 4, the limit member 30 has an annular wall with a specific height and a through hole centrally, a plurality of limit protrusions 32 on the inner wall of the through hole 31 are extended at an oblique angle toward a center of the through hole 31, a groove 33 is provided between each two neighboring limit protrusions 32, and a snap hole 34 is centrally formed within all limit protrusions 32.

When the rotor 10 is assembled with the base 20, the spindle 11 of the rotor 10 is penetrated through the center bore of the positioning ring 27 and the bearing 26, and when the end section 12 of the spindle 11 urges against the limit member 30, a larger external force shall be applied because the bore diameter of the snap hole 34 of the limit member 30 is slightly less than the outer diameter of the end section 12 of the spindle 11, so as to make each limit protrusion 32 deform and force the end section 12 to pass through the snap hole 34. Thus, each limit protrusion 32 is snapped on the reduced neck 13 of the spindle 11 to limit an axial displacement with respect to the shaft tube 21 and prevent the rotor 10 from dropping off.

Figure 5:
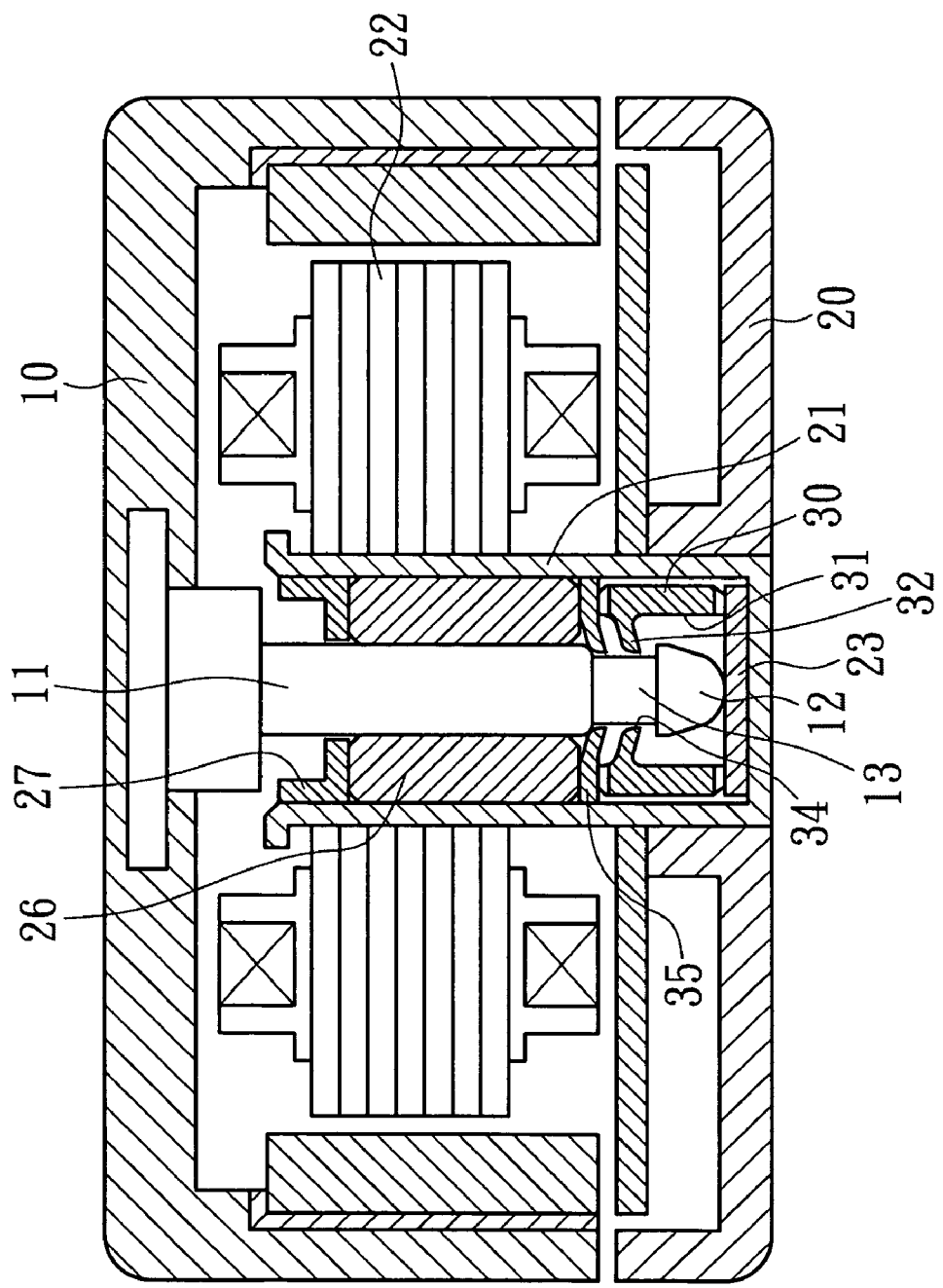
FIG. 5 is a preferred embodiment of the present invention.

As a result of the design of the limit member 30, the outer wall of the limit member 30 has a specific height for reserving sufficient accommodation space of the end section 12 after the end section 12 of the spindle 11 passes through the snap hole 34, thereby increasing the storing capacity of lubricant, prolonging the operational lifespan of the motor, reducing the assembling process, saving the production cost and lowering the assembling defective rate, Furthermore, illustrated in FIG. 5 is another preferred embodiment of the present invention. A snap ring 35 is additionally disposed between the limit member 30 and the bearing 26 and can be selected from a material having a higher hardness, e.g. metal material, than that of the limit member 30. The snap ring 35 and the limit protrusions 32 of the limit member 30 are simultaneously snapped on the reduced neck 13 of the spindle 11 to provide double protection and prevent the rotor 10 from dropping off upon operating especially when a motor structure with larger size is subject to an shock, an displacement, an impact force or environment influence.

In contrast to the conventional structure, the present invention at least includes the following characteristics:

reduced cost, labor hour, production process and assembling defective rate: As the outer wall itself of the limit member of the present invention provides a design with a specific height, sufficient space for accommodating the end section of the spindle can be reserved so as to increase the lubricant storage, extend the life duration of the motor, reduce necessary parts, save the assembling labor hour and production process, lower production cost and significantly decrease assembling defective rate.

fast and convenient assembly: The design of the limit member of the present invention not only decreases necessary the parts in use, saves the assembling hour, production process and cost, but also addresses a fast and convenient assembly.

In sum, from the above-mentioned characteristics, the present invention not only has novelty among similar products and progressiveness, but also has an industry utility.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A motor structure, including:
    a rotor centrally fixed with one end of a spindle, wherein the other end of said spindle is an end section having a reduced neck with an outer diameter less than that of said spindle;
    a base having a shaft tube and a stator set, wherein said shaft tube is a circular tube, and an end of said shaft tube is integrally formed on said base and closed so as to present a ⌴-like cross section thereof,
    wherein an abrasive gasket, a limit member and a bearing are sequentially disposed in said shaft tube and said spindle is rotationally inserted therein, and
    wherein said limit member has an annular wall with a specific height, a central through hole, and a plurality of limit protrusions on an inner wall of said through hole, said plurality of limit protrusions extending at an oblique angle toward a center of said through hole for snapping onto said reduced neck and limiting an axial displacement of said spindle.

2. The motor structure of claim 1, wherein a groove is formed between each two neighboring said limit protrusions, and a snap hole is centrally formed within each said protrusion for said end section of said spindle to push in.

3. The motor structure of claim 1, wherein a retainer ring is disposed between said limit member and said bearing, and a material with higher hardness is selected for said retainer ring than that of said limit member.

* * * * *